United States Patent
Ulupinar et al.

(10) Patent No.: US 8,755,793 B2
(45) Date of Patent: Jun. 17, 2014

(54) APPARATUS AND METHODS TO FACILITATE SEAMLESS HANDOFFS BETWEEN WIRELESS COMMUNICATION NETWORKS

(75) Inventors: Fatih Ulupinar, San Diego, CA (US); Peerapol Tinnakornsrisuphap, San Diego, CA (US); Parag A. Agashe, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 12/346,703

(22) Filed: Dec. 30, 2008

(65) Prior Publication Data

US 2009/0176489 A1    Jul. 9, 2009

Related U.S. Application Data

(60) Provisional application No. 61/019,179, filed on Jan. 4, 2008.

(51) Int. Cl.
*H04W 4/00*    (2009.01)

(52) U.S. Cl.
USPC ......... 455/432.2; 455/436; 370/331; 370/328

(58) Field of Classification Search
USPC .............. 455/432.2, 436–437, 462, 419, 403, 455/418, 560, 522; 370/349, 338, 331, 328; 379/21, 27.01, 29.01; 340/10.5, 10.33
See application file for complete search history.

(56) References Cited

U.S. PATENT DOCUMENTS

| | | | |
|---|---|---|---|
| 6,909,899 B2 * | 6/2005 | Wang et al. .................... | 455/436 |
| 7,046,647 B2 | 5/2006 | Oba et al. | |
| 7,916,715 B2 * | 3/2011 | Rezaiifar et al. .............. | 370/352 |
| 7,978,683 B2 * | 7/2011 | Balogh et al. ................. | 370/401 |
| 8,145,217 B2 * | 3/2012 | Wang et al. .................... | 455/436 |
| 2002/0136226 A1 | 9/2002 | Christoffel et al. | |
| 2002/0194385 A1 | 12/2002 | Linder et al. | |
| 2003/0104814 A1 | 6/2003 | Gwon et al. | |

(Continued)

FOREIGN PATENT DOCUMENTS

| CN | 1505413 A | 6/2004 |
|---|---|---|
| CN | 1756237 A | 4/2006 |

(Continued)

OTHER PUBLICATIONS

Jun Wang, "Access Authentication and Authorization in UMB", May 14, 2007, 3rd Generation Partnership Project 2 "3GPP2", pp. 1-3.*

(Continued)

*Primary Examiner* — Mahendra Patel
(74) *Attorney, Agent, or Firm* — Stanton Braden

(57) ABSTRACT

Apparatus and methods for facilitating a handover of a wireless communication device on a first wireless communication network to a second wireless communication network, wherein the first and second wireless communication networks include communications protocols that are incompatible, are disclosed. The facilitation can include establishing communications between the wireless communication device and an interworking component of the second wireless communication network using a transparent tunnel through the first wireless communication network so that a message containing session information for the second wireless communication network can be exchanged. The facilitation further includes creating a profile on the second wireless communication network for a communication session between the wireless communication device and the second wireless communication network.

20 Claims, 12 Drawing Sheets

(56) References Cited

U.S. PATENT DOCUMENTS

| | | |
|---|---|---|
| 2003/0125027 A1 | 7/2003 | Gwon et al. |
| 2004/0008632 A1 | 1/2004 | Hsu et al. |
| 2004/0125795 A1* | 7/2004 | Corson et al. ............... 370/328 |
| 2004/0203787 A1 | 10/2004 | Naghian |
| 2005/0143072 A1* | 6/2005 | Yoon et al. .................. 455/436 |
| 2005/0272432 A1 | 12/2005 | Ji et al. |
| 2006/0018280 A1 | 1/2006 | Kumar et al. |
| 2006/0045049 A1 | 3/2006 | Chung et al. |
| 2006/0046728 A1 | 3/2006 | Jung et al. |
| 2006/0072512 A1 | 4/2006 | Das et al. |
| 2006/0099949 A1* | 5/2006 | Jung et al. .................. 455/436 |
| 2006/0114871 A1 | 6/2006 | Buckley et al. |
| 2006/0126565 A1 | 6/2006 | Shaheen |
| 2006/0140150 A1 | 6/2006 | Olvera-Hernandez et al. |
| 2006/0203774 A1* | 9/2006 | Carrion-Rodrigo .......... 370/331 |
| 2007/0036109 A1 | 2/2007 | Kwak et al. |
| 2007/0160049 A1* | 7/2007 | Xie et al. ..................... 370/390 |
| 2007/0165574 A1 | 7/2007 | Srey et al. |
| 2007/0177585 A1 | 8/2007 | El Mghazli et al. |
| 2007/0249352 A1 | 10/2007 | Song et al. |
| 2007/0254625 A1* | 11/2007 | Edge ......................... 455/404.1 |
| 2007/0258399 A1 | 11/2007 | Chen |
| 2008/0031159 A1* | 2/2008 | Jokinen ....................... 370/255 |
| 2008/0089272 A1 | 4/2008 | Ahokangas |
| 2008/0089287 A1 | 4/2008 | Sagfors et al. |
| 2008/0092224 A1 | 4/2008 | Coulas et al. |
| 2008/0153495 A1* | 6/2008 | Ogami et al. ................. 455/436 |
| 2008/0165740 A1 | 7/2008 | Bachmann et al. |
| 2008/0259869 A1 | 10/2008 | Wang et al. |
| 2008/0281978 A1* | 11/2008 | Tang et al. ................... 709/232 |
| 2008/0305796 A1* | 12/2008 | Dolan .......................... 455/436 |
| 2008/0318575 A1 | 12/2008 | Ulupinar et al. |
| 2009/0016300 A1* | 1/2009 | Ahmavaara et al. .......... 370/331 |
| 2009/0040981 A1 | 2/2009 | Agashe et al. |
| 2009/0111468 A1* | 4/2009 | Burgess et al. ............... 455/436 |
| 2009/0201878 A1 | 8/2009 | Kotecha et al. |
| 2009/0202966 A1 | 8/2009 | Teicher et al. |
| 2009/0258631 A1 | 10/2009 | Forsberg et al. |
| 2009/0286527 A1* | 11/2009 | Cheon et al. ................ 455/422.1 |
| 2009/0303966 A1 | 12/2009 | Cherian et al. |
| 2010/0061340 A1 | 3/2010 | Ramle et al. |
| 2010/0190500 A1 | 7/2010 | Choi et al. |
| 2011/0044198 A1 | 2/2011 | Persson et al. |

FOREIGN PATENT DOCUMENTS

| | | |
|---|---|---|
| EP | 1441483 A2 | 7/2004 |
| EP | 1746856 A1 | 1/2007 |
| JP | 2008503108 A | 1/2008 |
| JP | 2008507875 A | 3/2008 |
| JP | 2008519568 A | 6/2008 |
| JP | 2010534999 A | 11/2010 |
| KR | 20060124397 A | 12/2006 |
| KR | 20070046012 A | 5/2007 |
| KR | 101042763 B1 | 6/2011 |
| RU | 2004137498 A | 6/2005 |
| RU | 2260919 C2 | 9/2005 |
| RU | 2265282 C2 | 11/2005 |
| TW | 535450 B | 6/2003 |
| TW | 200541248 | 12/2005 |
| TW | M294789 U | 7/2006 |
| WO | WO0031946 A2 | 6/2000 |
| WO | WO03030460 A2 | 4/2003 |
| WO | WO 2005036804 A2 * | 4/2005 |
| WO | WO2006011053 A1 | 2/2006 |
| WO | WO 2006049464 A1 * | 5/2006 |
| WO | WO2006052563 A2 | 5/2006 |
| WO | WO2006083039 | 8/2006 |
| WO | WO2006102650 A1 | 9/2006 |
| WO | WO2007007990 A1 | 1/2007 |
| WO | WO2008115757 | 9/2008 |
| WO | WO2008157633 | 12/2008 |
| WO | WO2009002586 A2 | 12/2008 |
| WO | WO2009012191 A2 | 1/2009 |
| WO | WO2009037623 A2 | 3/2009 |
| WO | WO2009154640 A2 | 12/2009 |

OTHER PUBLICATIONS

"3GPP TR 23.882 v1.8.0 3GPP System Architecture Evolution: Report on Technical Options and Conclusions (Release 7)", Feb. 21, 2007, Retrieved from the Internet: http://www.3gpp.org/fpt/Specs/html-info/23882.htm,XP002488584.

3GPP TS36.300 v0.9.0 Evolved Universal Terrestrial Radio Access (E-UTRA) and Evolved Universal Terrestrial Radio Access Network (E-UTRAN); Overall description; 3GPP Technical Specification Group Radio Access . Network, [Online] Mar. 4, 2007, p. 49.

3GPP: "Optimized Handover Procedures and Protocols between EUTRAN Access and cdma2000 HRPD Acess—Stage 3 (Release 8)" 3rd Generation Partnership Project;Technical Specification Group Core Network and Terminals; 3GPP Evolved Packet Systems, Jun. 6, 2008, pp. 1-21, XP002542969 Retrieved from the Internet: URL:http://www.3gpp.org/ftp/Specs/html-info/29276. htm<[retrieved on Aug. 25, 2009] Chapter 1;p. 7, Chapter 4; p. 8 Chapters 7.3-7.3.3; pp. 10-12 Chapter 7.5.6; p. 17.

3GPP2: "UMB and HRPD/lx Interworking, X.S0054-610-0 Version 1.0" 3GPP2, [Online] Aug. 29, 2008, pp. 1-60, XP002529917 Retrieved from the Internet: www.3gpp2.org/Public_html/specs /X.S0054-610-0_vl.0_080909.pdf> paragraphs [003.]-[5.1.3.].

"3rd Generation Partnership Project; Technical Specification Group Core Network and Terminal;3GPP System Architecture Evolution ; CT WG1 Aspects(Release 8)" 3GPP Draft; 24801-100, 3rd Generation Partnership Project (3GPP), Mobile Competence Centre ; 650, Route Des Lucioles ; F06921 Sophia-Antipolis Cedex ; France, Vol. CT WG1, no. Zagreb, Croatia; 20080623, May 21, 2008, XP050029410, Chapter 7.3.3.2.1; p. 56 Chapters 9.4.1-9.43; pp. 69-70 Chapter 10.4; p. 85 Chapters 10.14.1.1.2-10.14.1.1.3; p. 93.

Dutta, A. et al.: Columbia Univ: "A Framework of Media-Independent Pre-Authentication (MPA); draft-ohba-mobopts-mpa-framework-OO.txt" IETF Standard-Working-Draft, Internet Engineering Task Force, IETF, CH, Feb. 13, 2005, pp. 1-39, XP015039521 ISSN: 0000-0004 paragraphs [4.1.]-[4.3.]paragraph [5.4.].

Ericsson: "PDN GW identification" 3GPP Draft; S2-083275_23.402_CR0263_PDN_GW Identity_PA2, 3rd Generation Partnership Project (3GPP). Mobile Competence Centre ; 650, Route Des Lucioles : F-06921 Sophia-Antipolis Cedex ; France, vol. SA WG2, no. Prague; 20080512, Apr. 30, 2008, XP050265506 Chapters 8.3 and 9.5; pp. 24-29.

Stamoulis A et al., "Space-Time Block-Coded OFDMA With Linear Preoding for Multirate Services" IEEE Transactions on Signal Processing, 20020101 IEEE Service Center, New York, NY, US, vol. 50,Nr:1,pp.119-129, Jan. 2002, XP001200909.

Technical Specification Group Services and System Aspects: "Architecture enhancements for non-3GPP accesses TS 23.402 V8.0.0 (Release 8)" 3GPP-Standards, 2500 Wilson Boulevard,Suite 300, Arlington, Virginia 22201 USA, Dec. 2007, XP040278698 Chapter 4.1.2; p. 12 Chapters 4.3.2-4.3.5.2; pp. 22-24 Chapters 6.2.1-6.3; pp. 54-62 Chapters 8-9.3.2; pp. 82-104 Annex C.5; pp. 124-125.

"Univeral Mobile Telecommunications System (UMTS); Evolved Universal Terrestrial Radio Access (E-UTRA) and Evolved Universal Terrestrial Radio Access Network (E-UTRAN); Overall description; Stage 2 (3GPP TS 36.300 version 8.1.0 Release 8); ETSI TS 136 300" ETSI Standards, LIS, Sophia Antipolis Cedex, France, vol . 3-R2, No. V8.1.0, Jun. 1, 2007, pp. 1-107, XP014038500 ISSN: 0000-0001 paragraph [8.2.] paragraphs [010.]-[10.2.2.].

3GPP TSG-RAN WG2, "Generic approach for optimized non-3GPP handover", S2-073606 (Aug. 31, 2007).

3GPP TS 23.402, "3rd Generation Partnership Project; Technical Specification Group Services and System Aspects; Architecture enhancements for non-3GPP accesses (Release 8)", V8.1.1, Mar. 2008, pp. 1-163.

3GPP TS 36.300 V8.0.0 (Mar. 2007); Evolved Universal Terrestrial Radio Access (E-UTRA) and Evolved Universal Terrestrial Radio Access Network (E-UTRAN) (Mar. 31, 2007).

* cited by examiner

APPARATUS AND METHODS TO FACILITATE SEAMLESS HANDOFFS BETWEEN WIRELESS COMMUNICATION NETWORKS

CLAIM OF PRIORITY UNDER 35 U.S.C. §119

The present Application for Patent claims priority to Provisional Application No. 61/019,179 entitled "SYSTEM AND METHOD TO FACILITATE A SEAMLESS HANDOFF FROM HRPD TO UMB", filed Jan. 4, 2008, and assigned to the assignee hereof and hereby expressly incorporated by reference herein.

BACKGROUND

I. Field

The present application relates generally to wireless communications, and more specifically to methods and systems to facilitate seamless handoffs between incompatible wireless communication networks.

II. Background

Wireless communication systems are widely deployed to provide various types of communication content, such as voice, data, multimedia services, and so on. These systems may be multiple-access systems capable of supporting communication with multiple users by sharing the available system resources such as bandwidth and transmit power. Examples of such multiple-access systems include Code Division Multiple Access (CDMA) systems, Time Division Multiple Access (TDMA) systems, Frequency Division Multiple Access (FDMA) systems, 3GPP Long Term Evolution (LTE) systems, and Orthogonal Frequency Division Multiple Access (OFDMA) systems.

In recent years, users have also started to replace fixed line communications with mobile communications and have increasingly demanded great voice quality, reliable service, and low prices. The mobile communications are often implemented on mobile phone handsets or portable computers such as laptops or hand-held computers. As these devices have increased capabilities, users have desired to have access to data and multimedia services such as streaming video. As the demand for high-rate and multimedia data services rapidly grows, there lies a challenge to implement efficient and robust communication systems with enhanced performance to multiple users.

Although new network technologies are available that provides faster speeds, access networks implementing these technologies, referred to herein as "new access networks", are not always available. When available, a wireless device will use the new access network. However, if the wireless device is moving between a new access network and a traditional access network not implementing these technologies, inter-technology handoff needs to occur. In cellular telecommunications, the term "handoff" refers to the process of transferring an ongoing call or data session from one channel connected to a network to another. "Seamless" handoff would refer to a session where there is little or no delay associated with the handoff. The term "handover" may also be used to refer to handoff. Preferably, no interruption in service should occur for the user while the transition is occurring. Just as importantly, implementing the handoff mechanism should not require the older access network to be updated.

SUMMARY

The following presents a simplified summary of one or more aspects in-order to provide a basic understanding of such aspects. This summary is not an extensive overview of all contemplated aspects of the disclosure, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating a handoff between networks. According to related aspects, a method performed by a wireless communication device to facilitate a handoff between networks is provided. The method can include establishing a first communication session with a first wireless communication network having a first communication protocol. The method can also include determining a desire to handoff to a second wireless communication network having a second communication protocol, wherein the second wireless communication network and the first wireless communication network are incompatible for communication. The method further includes obtaining an address of an interworking function corresponding to the second wireless communication network, wherein the interworking function is operable to establish a second communication session in the second wireless communication network. Further still, the method includes tunneling, via the first communication protocol, a data message through the first communication network to the interworking function based on the address of the interworking function, wherein the data message includes a payload including session transfer information in the second communication protocol for the second wireless communication network, the session transfer information for the second communication network being completely transparent to the first communication network. Yet further still, the method includes establishing a second communication session with the second wireless communication network in the second communication protocol, wherein the second communication session is based on the data message.

Another aspect relates to a wireless communications apparatus. The wireless communications apparatus can include at least one processor configured to facilitate a handoff between networks. The processor includes a first module for establishing a first communication session with a first wireless communication network having a first communication protocol; a second module for determining a desire to handoff to a second wireless communication network having a second communication protocol, wherein the second wireless communication network and the first wireless communication network are incompatible for communication; a third module for obtaining an address of an interworking function corresponding to the second wireless communication network, wherein the interworking function is operable to establish a second communication session in the second wireless communication network; a fourth module for tunneling, via the first communication protocol, a data message through the first communication network to the interworking function based on the address of the interworking function, wherein the data message includes a payload including session transfer information in the second communication protocol for the second wireless communication network, the session transfer information for the second communication network being completely transparent to the first communication network; and a fifth module for establishing a second communication session with the second wireless communication network in the second communication protocol, wherein the second communication session is based on the data message.

Yet another aspect relates to a wireless communications apparatus that facilitates a handoff between networks. The wireless communications apparatus can include means for establishing a first communication session with a first wireless communication network having a first communication protocol. The wireless communications apparatus can additionally include means for determining a desire to handoff to a second wireless communication network having a second communication protocol, wherein the second wireless communication network and the first wireless communication network are incompatible for communication. The wireless communications apparatus further includes means for obtaining an address of an interworking function corresponding to the second wireless communication network, wherein the interworking function is operable to establish a second communication session in the second wireless communication network. Further still, the wireless communications apparatus includes means for tunneling, via the first communication protocol, a data message through the first communication network to the interworking function based on the address of the interworking function, wherein the data message includes a payload including session transfer information in the second communication protocol for the second wireless communication network, the session transfer information for the second communication network being completely transparent to the first communication network; and also means for establishing a second communication session with the second wireless communication network in the second communication protocol, wherein the second communication session is based on the data message.

Still another aspect relates to a computer program product, which can have a computer-readable medium including code for causing at least one computer to establish a first communication session with a first wireless communication network having a first communication protocol. The computer-readable medium can also include code for causing the at least one computer to determine a desire to handoff to a second wireless communication network having a second communication protocol, wherein the second wireless communication network and the first wireless communication network are incompatible for communication. Moreover, the computer-readable medium can include code for causing the at least one computer to obtain an address of an interworking function corresponding to the second wireless communication network, wherein the interworking function is operable to establish a second communication session in the second wireless communication network. Further, the computer-readable medium can include a fourth set of codes for causing a computer to tunnel, via the first communication protocol, a data message through the first communication network to the interworking function based on the address of the interworking function, wherein the data message includes a payload including session transfer information in the second communication protocol for the second wireless communication network, the session transfer information for the second communication network being completely transparent to the first communication network. The computer-readable medium can include a fifth set of codes for causing a computer to establish a second communication session with the second wireless communication network in the second communication protocol, wherein the second communication session is based on the data message.

According to related aspects, a method performed by an interworking function to facilitate a handoff between networks is provided. The method can include receiving a tunneled message from a wireless communication device through a first wireless communication network using a first communication protocol, wherein the message includes a payload including session transfer information for the wireless communication device compliant with a second communication protocol for a second wireless communication network, wherein the second wireless communication network and the first wireless communication network are incompatible for communication. The method can also include establishing a session profile for the wireless communication device for a second communication session with the second wireless communication network in the second communication protocol, wherein the second communication session is based on the message.

Another aspect relates to an interworking function apparatus. The interworking function apparatus can include at least one processor configured to facilitate a handoff between networks. The processor is further configured to receive a tunneled message from a wireless communication device through a first wireless communication network using a first communication protocol, wherein the message includes a payload including session transfer information for the wireless communication device compliant with a second communication protocol for a second wireless communication network, wherein the second wireless communication network and the first wireless communication network are incompatible for communication. The processor is further configured to establish a session profile for the wireless communication device for a second communication session with the second wireless communication network in the second communication protocol, wherein the second communication session is based on the message.

Yet another aspect relates to an apparatus in an interworking function configured to facilitate a handoff between networks. The wireless communications apparatus can include means for receiving a tunneled message from a wireless communication device through a first wireless communication network using a first communication protocol, wherein the message includes a payload including session transfer information for the wireless communication device compliant with n a second communication protocol for a second wireless communication network, wherein the second wireless communication network and the first wireless communication network are incompatible for communication. The wireless communications apparatus can additionally include means for establishing a session profile for the wireless communication device for a second communication session with the second wireless communication network in the second communication protocol, wherein the second communication session is based on the message.

Still another aspect relates to a computer program product, which can have a computer-readable medium including code for causing at least one computer to receive a tunneled message from a wireless communication device through a first wireless communication network using a first communication protocol, wherein the message includes a payload including session transfer information for the wireless communication device compliant with a second communication protocol for a second wireless communication network, wherein the second wireless communication network and the first wireless communication network are incompatible for communication. The computer-readable medium can also include code for causing the at least one computer to establish a session profile for the wireless communication device for a second communication session with the second wireless communication network in the second communication protocol, wherein the second communication session is based on the message.

Still yet another aspect relates to an apparatus for facilitating a handoff between networks that is non-interoperable for communication there between. The apparatus includes a first establisher configured to establish communication with a first network that includes a first communication protocol; a determiner configured to determine an address of an interworking function for a second network. The second network using a second communication protocol that is non-interoperable with the first communication protocol. The apparatus further includes a second establisher configured to establish communication with the second network using the second communication protocol; and a tunneler configured to establish a tunnel through the first network using the first communication protocol, wherein the tunnel provides communication between the second establisher and the interworking function for the second network in the second communication protocol that is undetectable by the first network.

Still yet another aspect relates to an apparatus in an interworking function configured to facilitate a handoff between networks. The apparatus includes a receiving unit configured to receive a message from a wireless communication device in a first network. The first network using a first communication protocol and the message being tunneled through the first network using the first communication protocol. The apparatus also includes a communication profile establisher for establishing a communication profile, based on the receipt of the message from the wireless communication device, for the wireless communication device in a second network. The second network using a second communication protocol that is non-interoperable with the first communication protocol. The message includes content that provides information necessary for the establishment of the communication profile, the content being formatted in the second communication protocol.

To the accomplishment of the foregoing and related ends, the one or more aspects include the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Figure 1:
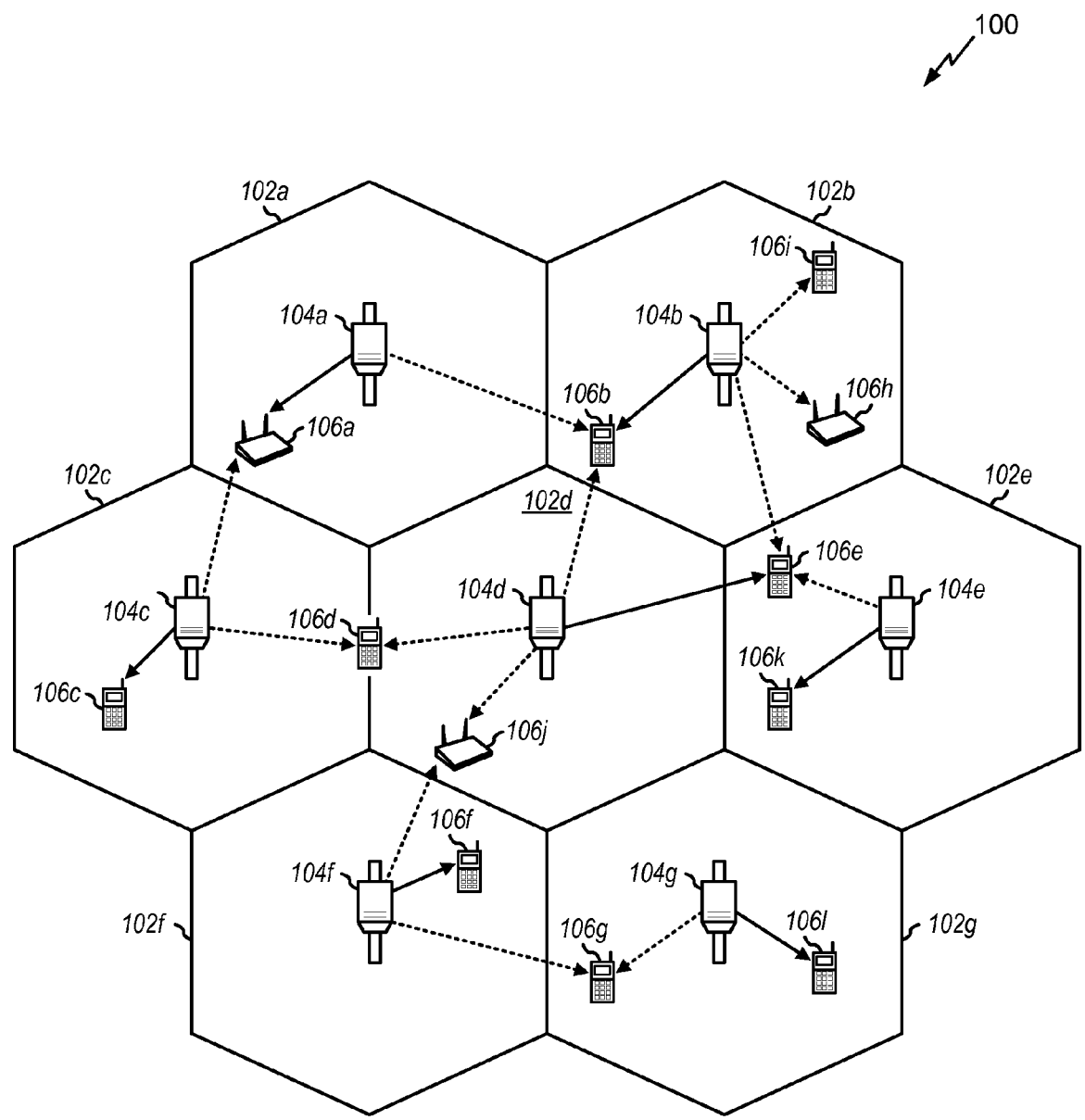
FIG. 1 is a block diagram of a wireless communication system configured in accordance with one aspect of the disclosure.

The word "exemplary" is used herein to mean "serving as an example, instance, or illustration." Any aspect described herein as "exemplary" is not necessarily to be construed as preferred or advantageous over other aspects. The disclosed aspects may be applied to any one or combinations of the following technologies: Code Division Multiple Access (CDMA) systems, Multiple-Carrier CDMA (MC-CDMA), Wideband CDMA (W-CDMA), High-Speed Packet Access (HSPA, HSPA+), Time Division Multiple Access (TDMA) systems, Frequency Division Multiple Access (FDMA) systems, Orthogonal Frequency Division Multiple Access (OFDMA) systems, or other multiple access techniques. A wireless communication system may be designed to implement one or more standards, such as Interim Standard 95 (IS-95), cdma2000, IS-856, W-CDMA, TD-SCDMA, and other standards.

For the purposes of facilitating the understanding of the various aspects of the disclosure, the following list of abbreviations will be used:

| Abbreviation | Description |
| --- | --- |
| 3GPP2 | 3rd Generation Partnership Project 2 |
| AAA | Authentication, Authorization and Accounting |
| AGW | Access Gateway |
| AN | Access Network |
| ANRI | Access Network Route Instance |
| AT | Access Terminal |
| ATI | Access Terminal Identifier |
| BS | Base Station |
| CANID | Current Access Network Identifiers |
| CHAP | Challenge Handshake Authentication Protocol |
| CVSE | Critical Vendor Specific Extension |
| DAP | Data Attachment Point |
| DNS | Domain Name Service/System |
| DRI | Data Ready Indicator |
| eBS | Evolved Base Station |
| FLSE | Forward Link Serving eBS |
| FQDN | Fully Qualified Domain Name |
| HRPD RAN or HRPD | High Rate Packet Data Radio Access Network |

-continued

| Abbreviation | Description |
|---|---|
| IAS | Inter-ANRI Signaling |
| IE | Information Element |
| IOS | Interoperability Specification |
| IP | Internet Protocol |
| IPT | Internet Protocol Tunneling |
| ISF | Interworking Security Function |
| IWS | Interworking Solution |
| L2TPv3 | Layer 2 Tunneling Protocol Version 3 |
| LCP | Link Control Protocol |
| LMA | Local Mobility Anchor |
| LLT | Link-Layer Tunneling |
| LSB | Least Significant Bit |
| MAC | Medium Access Control |
| MEI | Mobility Event Indicator |
| MIP | Mobile IP |
| MSB | Most Significant Bit |
| MSC | Mobile Switching Center |
| MSCe | Mobile Switching Center Emulation |
| MM | Mobility Management |
| NID | Network Identification |
| NVSE | Normal Vendor Specific Extension |
| PANID | Previous Access Network Identifiers |
| PCF | Packet Control Function |
| PDSN | Packet Data Serving Node |
| PMIP | Proxy Mobile Internet Protocol |
| PPP | Point-to-Point Protocol. |
| QoS | Quality of Service |
| RADIUS | Remote Authentication Dial-In User Service |
| RAN | Radio Access Network |
| RTC | Reverse Traffic Channel |
| SC | Session Control |
| SID | System Identification |
| SRNC | Session Reference Network Controller |
| SSID | Stable Session Identifier |
| TFT | Traffic Flow Template |
| UATI | Unicast Access Terminal Identifier |
| UDP | User Datagram Protocol |
| UMB | Ultra Mobile Broadband |
| VCC AS | Voice Call Continuity Application Server |
| VoIP | Voice over IP |

FIG. 1 illustrates an exemplary wireless communication system 100 configured to support a number of users, in which various disclosed aspects may be implemented. As shown in FIG. 1, by way of example, the wireless communication system 100 provides communication for devices in multiple cells 102, such as, for example, macro cells 102a-102g, with each cell being serviced by a corresponding access point (AP), illustrated as APs 104a-104g in the figure. Each cell may be further divided into one or more sectors. Various access terminals (ATs) 106, illustrated as ATs 106a-106k, also known interchangeably as user equipment (UE), are dispersed throughout the system. Each one of ATs 106a-106k may communicate with one or more APs 104a-104g on a forward link (FL) and/or a reverse link (RL) at a given moment, depending upon whether the particular AT is active and whether it is in soft handoff, for example. The wireless communication system 100 may provide service over a large geographic region. For example, macro cells 102a-102g may cover a few city blocks in a neighborhood.

Figure 2:
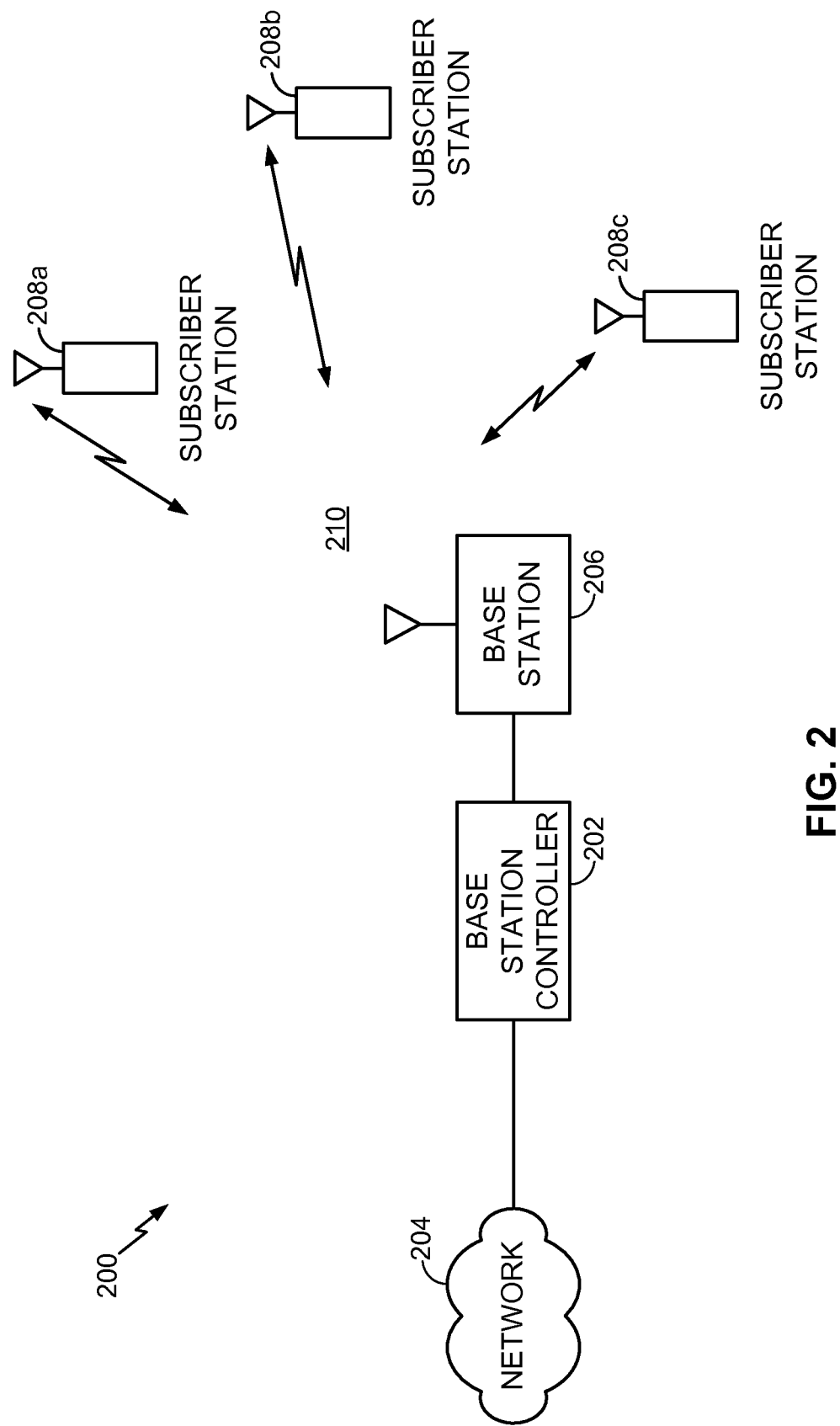
FIG. 2 is a block diagram of a CDMA communications system configured in accordance with one aspect of the disclosure.

FIG. 2 illustrates an exemplary CDMA communications system 200. As shown in FIG. 2, a base station controller 202 can be used to provide an interface between a network 204 and all base stations dispersed throughout a geographic region. For ease of explanation, only one base station 206 is shown. The geographic region is generally subdivided into smaller regions known as cells. Again, for ease of explanation, only one cell 210 is shown. The base station 206 is configured to serve all subscriber stations 208 in its respective cell, which in this case is the cell 210. In some high traffic applications, the cell 210 may be further divided into sectors, with a base station serving each sector. In the described aspect, three subscriber stations 208a-208c are shown in communication with the base station 206. Each subscriber station 208a-208c may access the network 204, or communicate with other subscriber stations 208, through one or base stations 206 under control of the base station controller 202.

Figure 3:
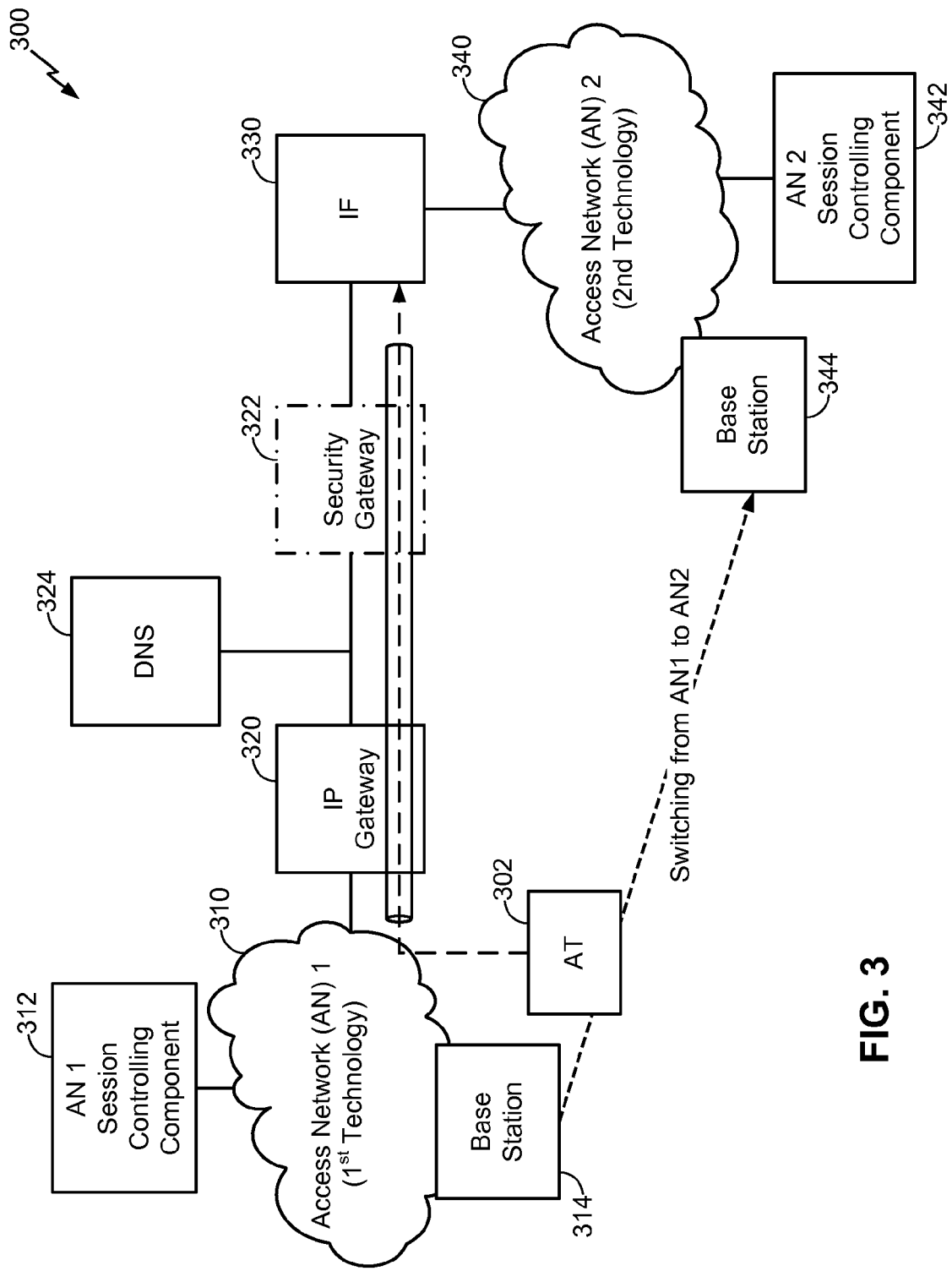
FIG. 3 is a block diagram of a system to facilitate seamless handoffs of an access terminal (AT) between two different types of networks configured in accordance with one aspect of the disclosure.

FIG. 3 illustrates a system 300 to facilitate a seamless handoff between two different types of networks configured in accordance to one aspect of the disclosure.

The system 300 includes a first access network, illustrated as access network (AN) 1 310, and a second access network, illustrated as access network AN 2 340, both to which an access terminal (AT) 302 is configured to connect. The AN 1 310 and the AN 2 340 utilizes a first and second wireless communications technologies, respectively. In one aspect, for example, the first and second wireless communication technologies are incompatible such that a handoff cannot be directly implemented by a respective one of the AN 1 310 and the AN 2 340 to the other one of the networks. The AN 1 310 and the AN 2 340 each includes base stations to connect to ATs. As illustrated, the AN1 310 includes a base station 314 and the AN2 340 includes a base station 344. Each AN includes an AN session controlling component that stores session information between the network and each AT associated with the network. Thus, AN 1 310 includes an AN 1 session controlling component 312 and AN 2 340 includes an AN 2 session controlling component 342.

Figure 4:
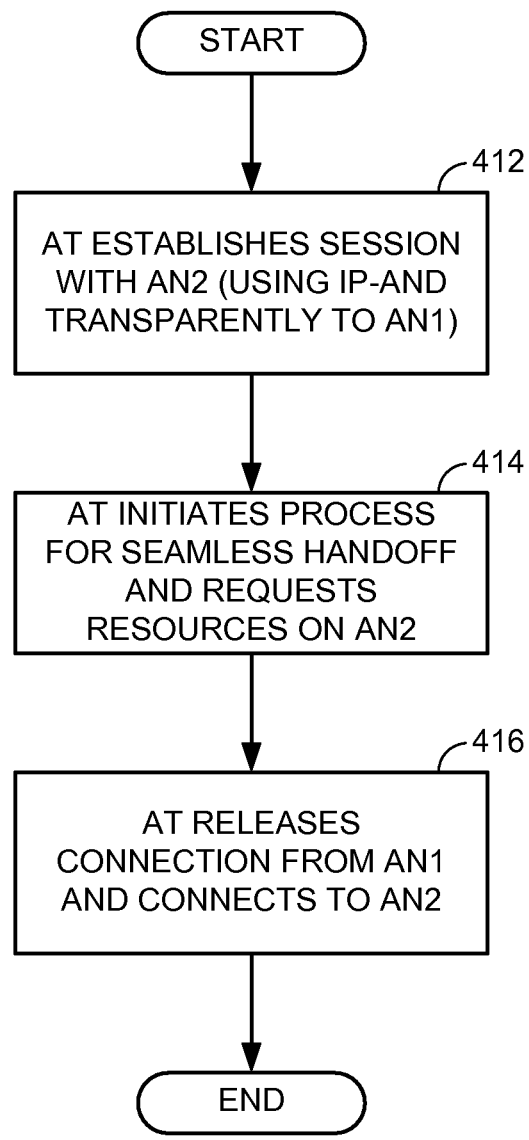
FIG. 4 is a flow diagram illustrating an overview of a process to facilitate seamless handoffs between two different types of networks, such as that illustrated in FIG. 3, configured in accordance to one aspect of the disclosure.

The system 300 includes an Internet Protocol (IP) gateway 320 to which AN 1 310 is connected and allows the ATs associated with AN 1 310 to communicate data across a packet-switched internetwork using the Internet Protocol (IP). For example, the ATs associated with AN 1 310 can communicate with devices or systems that are coupled to the packet-switched internetwork, which may include the "Internet" using IP. The internetwork can contain such servers that provide IP address lookup and name translation such as one or more Domain Name System (DNS) servers similar to a DNS server 324. In one aspect, a security mechanism, such as a security gateway 322, is used to control access from the IP gateway 320. A query for the contact information for the security gateway 322 may be determined by using DNS server 324. Further illustrated in FIG. 3 is an Internetworking Function (IF) component 330 that provides services necessary for an AT such as the AT 302 to facilitate a handoff between the base station 314 of the AN 1 310 and the base station 344 of the AN 2 340, as described further with reference to FIG. 4, where a seamless handoff facilitating process 400 is illustrated.

The IF component 330 is operable to receive handoff instructions and other messages from the AT 302 in a protocol suitable for AN 2 340, but received within one or more data packets formatted according to the protocol of AN 1 310 so that these messages are carried as data packets. These data packets are ignored as commands, as far as AN 1 310 is concerned. Thus, the message is actually formatted according to protocol of AN 2 340 but is carried transparently on AN 1 310 as "data." Therefore, AN 1 310 does not explicitly interpret or understand the message. To carry this message as data on AN1 310, however, the AT 302 needs to transmit/receive messages using AN 1 310 protocol (as it does with all other data packets). Therefore, the AT 302 is logically communicating with AN 2 340 initially. Accordingly, IF component 330 is operable to establish an appropriate interface for the session controller and the BS of the second network based on the received messages. For example, the IF component 330, when implemented for a HRPD to Ultra Mobile Broadband (UMB) application, will operate on what an AT sends to establish an appropriate interface for the UMB Session Reference Network Controller (SRNC) and the UMB Evolved Base Station (eBS) of the UMB network. In the UMB standard, the UMB SRNC includes an interface for communication with the UMB eBS. Further, the UMB eBS can communicate with other UMB eBS's. Thus, because the IF component 330 appears as another UMB eBS to the system, the IF component 330 can communicate with other components on the network such as the other UMB eBS's and the UMB SRNC. Specifically, the IF component 330 appears as an existing base station that can interface with other UMB eBS's and the UMB SRNC for the AT without having to modify the UMB network. In this approach, there is no change both to the HRPD-side and UMB-side for interworking. Further, the IF component 330 also can be applied in an LTE standard communication network, with the IF component 330 acting as the Mobility Management Entity (MME) to interface with a Serving Gateway (SGW) and evolved Node B (eNB) for a User Equipment (UE).

In contrast, a common approach for inter-network handoff of an AT between two networks is to utilize a control plane. In this approach, the AT sends a special message that requests handoff from an access network with one technology, referred to as access network A, to a target access network with another technology, and referred to as access network B. This special message is often a control message based on network A protocol. Network A subsequently use another interface to communicate this request with access network B so that access network B can return information to access network A that is then passed back to the AT. This information is needed by the AT to establish a session with network B before decoupling from network A. This requires that network B, the target network, has to include technology with a defined interface that is common between the two networks so that they understand how to communicate with each other. Furthermore, it requires changes in Network A to support modification on both its communication with the AT and a new interface to communicate with Network B. Thus, the technologies for the two networks need to be very tightly coupled, which is disadvantageous such that the technology of the existing infrastructure, such as network A, would have to be customized for interoperating with more than one network.

In contrast, in one aspect of the disclosure, seamless handoffs of ATs between access networks implementing different technologies may be facilitated without having to maintaining a coupling of the technologies. In other words, seamless handoff can be facilitated between different access networks so that no changes need to be made to existing infrastructures. Further, the different access networks would not need to support an interface with each other, which would allow the access networks to be "overlaid" on top of each other. For example, the access networks may implement wireless communication technology that uses different electromagnetic spectrums, and the ATs, which support these different spectrums, can switch (i.e., be handed off) from one network to another seamlessly without each AN being aware of inter-technology handoff.

Returning to FIG. 4, before the AT 302 can be handed off to the AN 2 340, a communication session profile in the AN 2 340 needs to be established for the AT 302 in step 412. The communication session profile is established by the AT 302 with the AN 2 340 in a transparent fashion to the AN 1 310. In an aspect of the disclosure, as the communication session profile is created and stored in the AN 2 session controlling component 342, the AT 302 needs to be able to communicate with the AN 2. This is achieved by the AT 302 initially communicating with the IF 330 so as to then gain access to the AN 2 session controlling component 342. Once the communication session profile has been established, handoff can occur as the AT 302 can communicate with the base station 344.

In an aspect of the disclosure, the AT 302 establishes communicates with the IF 330 of the AN 2 340 by tunneling messages through the AN 1 310 using IP packets. In this fashion, AN 1 310 does not need to be configured to communicate with AN 2 340.

The AT 302 first determines the IP address of the IF component 330. The AT 302 may determine the IP address through a query to one of the DNS servers, such as the DNS server 324, that are accessible from the IP gateway. The IP address that is returned to the AT 302 may be based on one or more criteria, including a physical location of the AT 302 with respect to the base station 344, an ID stored on the AT 302, and a context/session that the AT 302 desires to establish. The AT 302 provides an indicator of the geographic location of the AT, and during the look-up or contact process, the target network will allow the AT to contact the IF that is geographically closest to it.

The AT 302 initiates a process for seamless handoff, which includes creating a session profile in the AN 2 340. This includes contacting the AN 2 session controlling component 342. In an aspect of the disclosure, the AT 302 sends a request and the information needed to establish the session profile to the IF component 330, which then translates the information for the AN 2 session controlling component 342.

In step 414, once the session profile has been established for the AT 302, the AT 302 will initiate the handoff and request that AN 2 340 begin to assign dedicated resources such as radio resources and backhaul resources to the AT 302. In an aspect of the disclosure, the handoff will require that the AN 2 340 provide the AT 302 with a complete set of profile for the AN 2 340 that is unbeknownst to the AN1 310.

In step 416, once the communications resources have been established for the AT 302 in the AN 2 340, the AT 302 will release its connection with the base station 314 of the AN 1 310 and connect to the base station 344 of the AN 2 340. In an aspect of the disclosure, the AN 2 340 may buffer data for the AT 302 during its transition from the AN 1 310 and the AN 2 340 that is needed to ensure a seamless handoff. Typically, the buffering is performed by a gateway device (not shown to simplify explanation). The gateway should buffer data for the AT instead of sending it to the IF because the IF is not a real BS, but only acts as one to establish the handoff.

Figure 5:
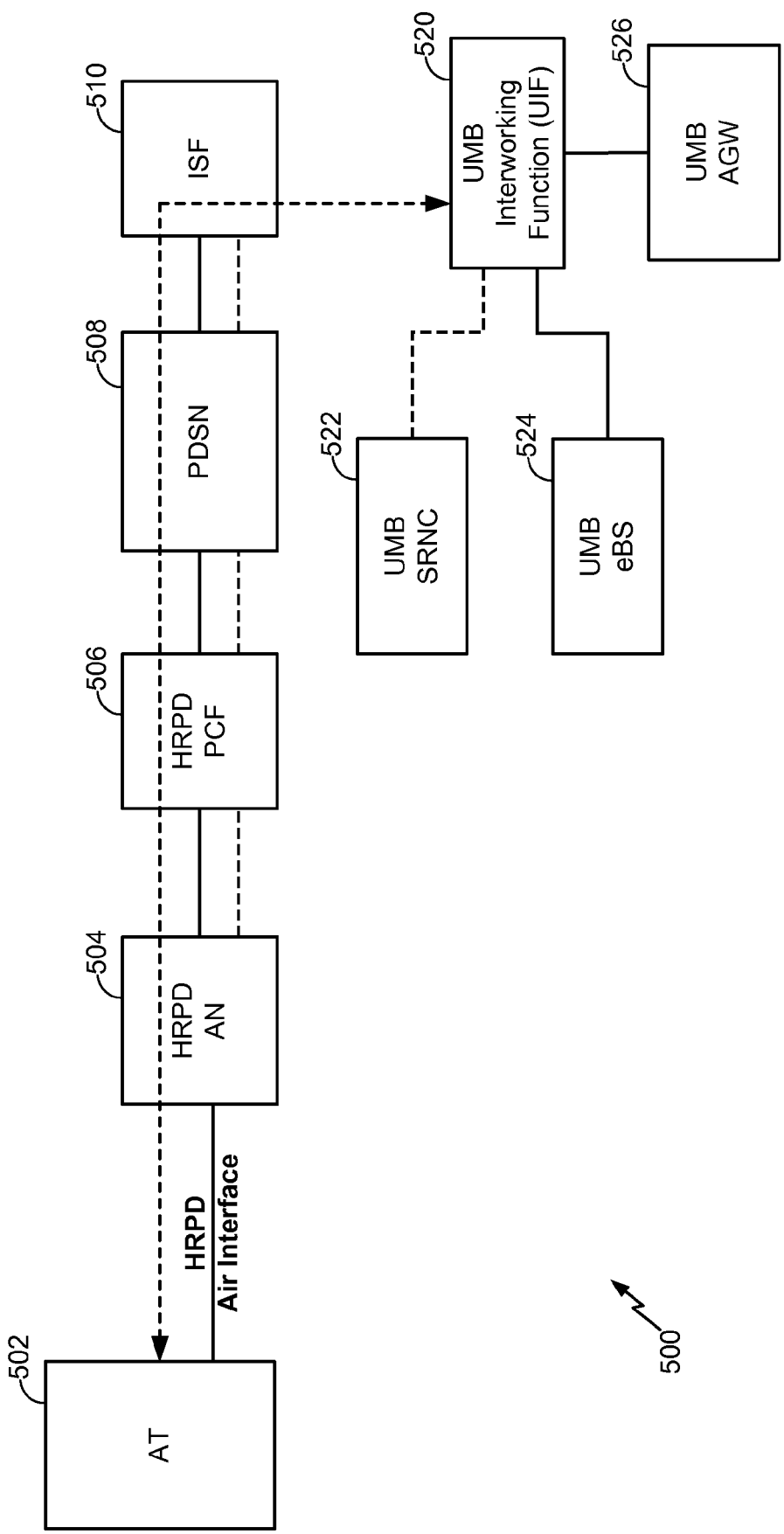
FIG. 5 is a block diagram of a system to facilitate a seamless handoff from an High Rate Packet Data Radio (HRPD) network to an Ultra Mobile Broadband (UMB) network confirmed in accordance to one aspect of the disclosure.

FIG. 5 illustrates a system 500 to facilitate a seamless handoff from an HRPD AN 504 to a UMB network, according to one aspect of the disclosure. In FIG. 5, solid lines indicate signaling and bearer, and dashed lines indicate only signaling. The HRPD AN 504 is coupled to a HRPD Packet Control Function (PCF) 506, which is itself coupled to a Packet Data Serving Node (PDSN) 508. An Interworking Security Function (ISF) component 510 is included for performing security services. For example, the ISF component 510 serves as a termination point for a secured tunnel between the AT 502 and the target UMB Radio Access Network (RAN) over the HRPD system.

The system 500 includes a control end point for the system 500 such as a UMB Session Reference Network Controller (SRNC) 522. The control end point maintains a record of the association between each AT and a particular base station that is responsible for providing wireless communication support to that AT. The base station is referred to as a Forward Link Serving eBS (FLSE) for the AT. FIG. 5 illustrates an UMB Evolved Base Station (eBS) 524 as an example of a base station. Each base station is required to register its association with a particular AT with the control end point of the system 500, such as the UMB SRNC 522, to ensure that a consistent record of which base station is handling that AT is maintained.

The system 500 includes a data end point for the system 500 such as a UMB access gateway (AGW) 526. Data end points provides routing for each AT such that it directs data flow to the particular base station that is responsible for providing wireless communication support to that AT. Each base station is required to register its association with a particular AT with the data end point of the system 500, such as the UMB AGW 526, to ensure that proper data routing of the data directed to the particular AT is sent to the base station that is handling that AT is maintained. Once registered, the base station is referred to as the data attachment point (DAP) for the AT. The order of registration of a base station with a control end point and a data end point may change. In the example described below, the base station will first register with the data end point as a DAP before registering with the control end point as an FLSE.

The system 500 also includes a UMB Interworking Function (UIF) component (also referred to as an UMB eBS-lite component) 520 coupled to the ISF 510. In one aspect, the UIF component 520 is a UMB eBS that does not have radio transceiver capability and serves as a UMB packet tunneling endpoint. The UIF component 520 communicates with the AT 502 using UMB packet tunneling over IP. The UIF component 520 allows pre-setup of UMB sessions before an AT makes an inter-technology handoff to the UMB network. In an aspect of the invention, the UIF component 520 should support all UMB Interoperability Specification (IOS) interfaces.

In an aspect of the disclosure, the UIF component 520 may be a standalone entity or may be collocated at a control point for the system 500 such as the UMB SRNC 522. In the alternative, instead of being collocated at a control point, the UIF component 520 may be collocated at a base station such as the eBS 524.

The operation of the system 500 will be described with reference to the call flow diagram shown in FIGS. 6-8, below. Described in detail therein is an aspect of the call flow that occurs when the AT 502 performs handoff from an HRPD network to a UMB network.

Figure 6:
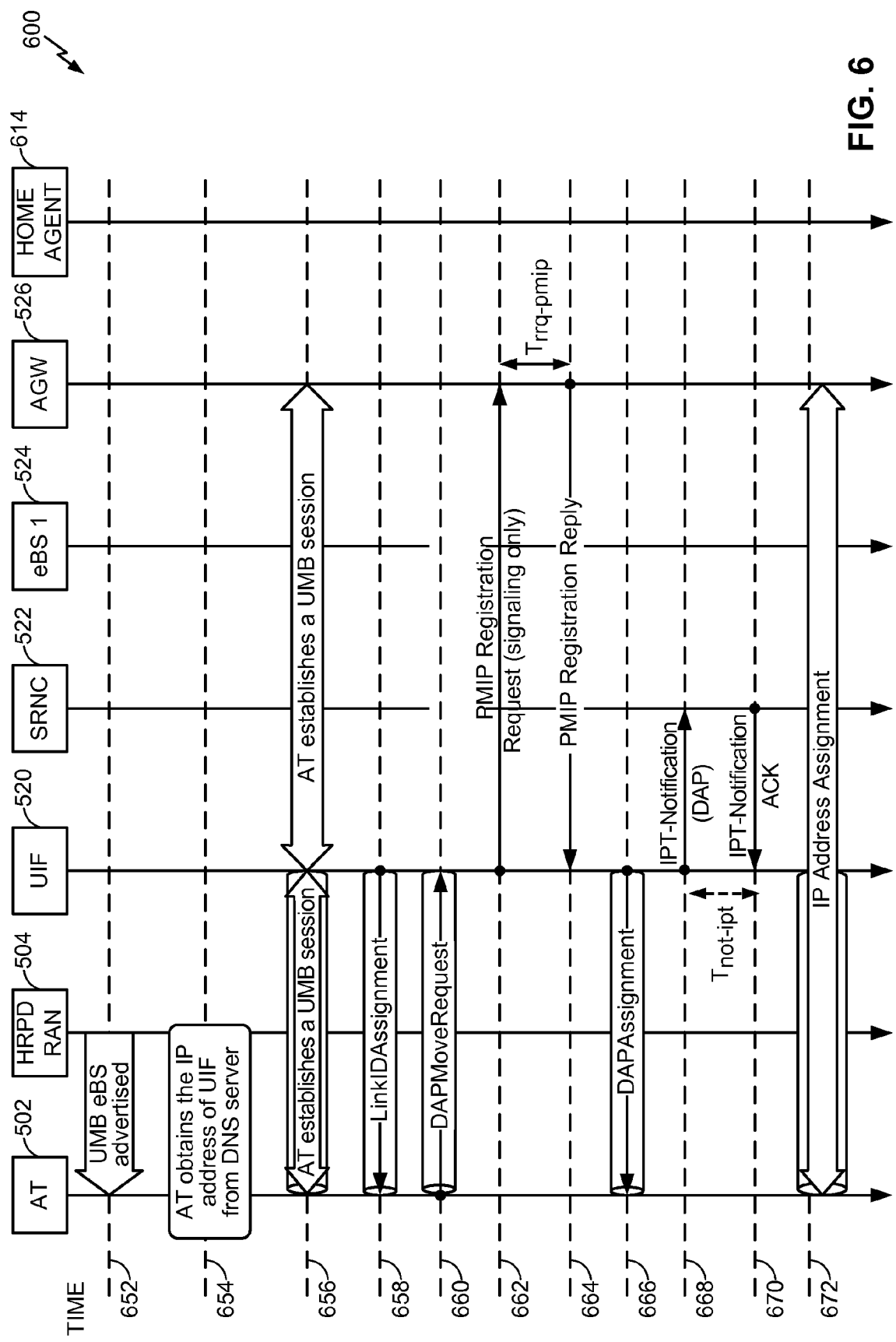
FIG. 6 is a call flow diagram of an initial process to facilitate a seamless handoff from the HRPD network to the UMB network of FIG. 5 in accordance to one aspect of the disclosure.

FIG. 6 illustrates a call flow 600 that facilitates an initialization of a seamless handoff from the HRPD AN 504 to the UMB network in accordance to an aspect of the disclosure where, at point 652, the AT 502 detects an existence of the UMB network by finding an advertised UMB pilot in an air interface overhead message from the HRPD AN 504. The AT 502 can determine that it wants to switch networks based on either an implementation of an existing standard; for example, by the advertising presence of neighboring technologies, or a proprietary determination approach. For example, the AT 502 will always switch to a faster network if one is detected. The AT 502 obtains the AN ID of the advertised UMB eBS 524.

At point 654, the AT 502 obtains the Internet Protocol (IP) address of the UIF component 520 from a domain name system (DNS) server, using the same approach as described in the DNS lookup. The IP address will direct the AT 502 to a UIF component closest to the AT 502. The AT 502 will then establish an IPsec tunnel to the UIF component 520 through the HRPD AN 504. In aspects where the ISF component 510 is part of the system 500, the AT 502 will need to determine the IP address of the ISF component 510 by performing a DNS query and establishing an IPsec tunnel with the ISF component 510 before the AT 502 contacts the UIF component 520 to establish the IPsec tunnel with the UIF component 520. For the DNS query, the AT 502 shall form the Fully Qualified Domain Name (FQDN) for the ISF component 510 as follows:

<UMB-ANID>.UMB.ISF.<domain-name> and the FQDN for the UIF component 520 would be in format of:

<UMB-ANID>.UMB.RAN.<domain-name> where:

<domain-name> is discovered via Dynamic Host Configuration Protocol (DHCP), and <UMB-ANID> is the hex representation in ASCII of the HRBD subnet provided to the AT 502 via the HRPD air-interface or UMB air-interface.

The security policy of the network 500 may allow for the setup of an IP tunnel between the AT 502 and a target RAN without establishing an IPsec tunnel through the ISF component 510. In this case, the IP address of the ISF component 510 may be configured to be returned as all zeros to indicate to the AT 502 that the establishment of an IPsec tunnel to the ISF component 510 is not required before an IPsec tunnel is established with the UIF component 520.

At point 656, the AT performs a UMB session establishment with the UIF component 520 and the UMB SRNC 522 if the UMB session does not exist or cannot be retrieved by the UIF component 520. Otherwise, the UIF component 520 retrieves the UMB session from the UMB SRNC 522. In either case, the UIF component 520 will initially become the FLSE for the AT 502.

At point 658, the UIF component 520 assigns a LinkID for the AT 502 so that the AT 502 can start IP services on the UMB RAN. Specifically, the LinkID assignment process provides the AT 502 with the information necessary to connect with the UBM RAN.

At point 660, upon assignment of the LinkID, if the AT 502 is configured to use AT-assisted DAP handoff, the AT 502 sends a DAPMoveRequest message to the UIF component 520 to trigger an initial Proxy Mobile IP (PMIP) tunnel setup between the UIF component 520 and the UMB AGW 526. In other words, the AT will trigger a handoff of the DAP registration with the access gateway of the UMB RAN by sending this request; such that the UIF component 520 informs the UMB AGW 526 that it is the DAP for the AT 502. If AT-assisted DAP handoff is not configured for the AT 502, the UIF component 520 will still autonomously continue with the following step.

At point 662, the UIF component 520 sends a PMIP-Registration Request message to the UMB AGW 526 to initiate the PMIP tunnel setup, with a signaling-only binding-type extension being indicated. The UIF component 520w will also start a timer $T_{rrq\text{-}pmip}$ as a timeout counter.

At point 664, the UMB AGW 526 sends a PMIP Registration Reply message to complete PMIP tunnel setup with the UIF component 520 to confirm that the UIF component 520 is now the DAP for the AT 502. The timer $T_{rrq\text{-}pmip}$ is now stopped.

At point 666, the UIF component 520 sends a DAPAssignment message to the AT 502 that indicates to the AT 502 that the UIF component 520 is now the DAP for the AT 502.

At point 668, the UIF component 520 sends an IPT-Notification message to the UMB SRNC 522 to indicate it is the current DAP for the AT 502 and starts a timer $T_{not\text{-}ipt}$ as a timeout counter for this registration.

At point 670, the UMB SRNC 522 responds with an IPT-Notification Ack message to acknowledge that the UIF component 520 is the FLSE for the AT 502. Upon receipt of the message, the UIF component 520 stops timer $T_{not\text{-}ipt}$.

At point 672, upon assignment of the DAP, the AT 502 presents an IP interface to the application and may request an IP address from the UMB AGW 526 at any time.

Figure 7:
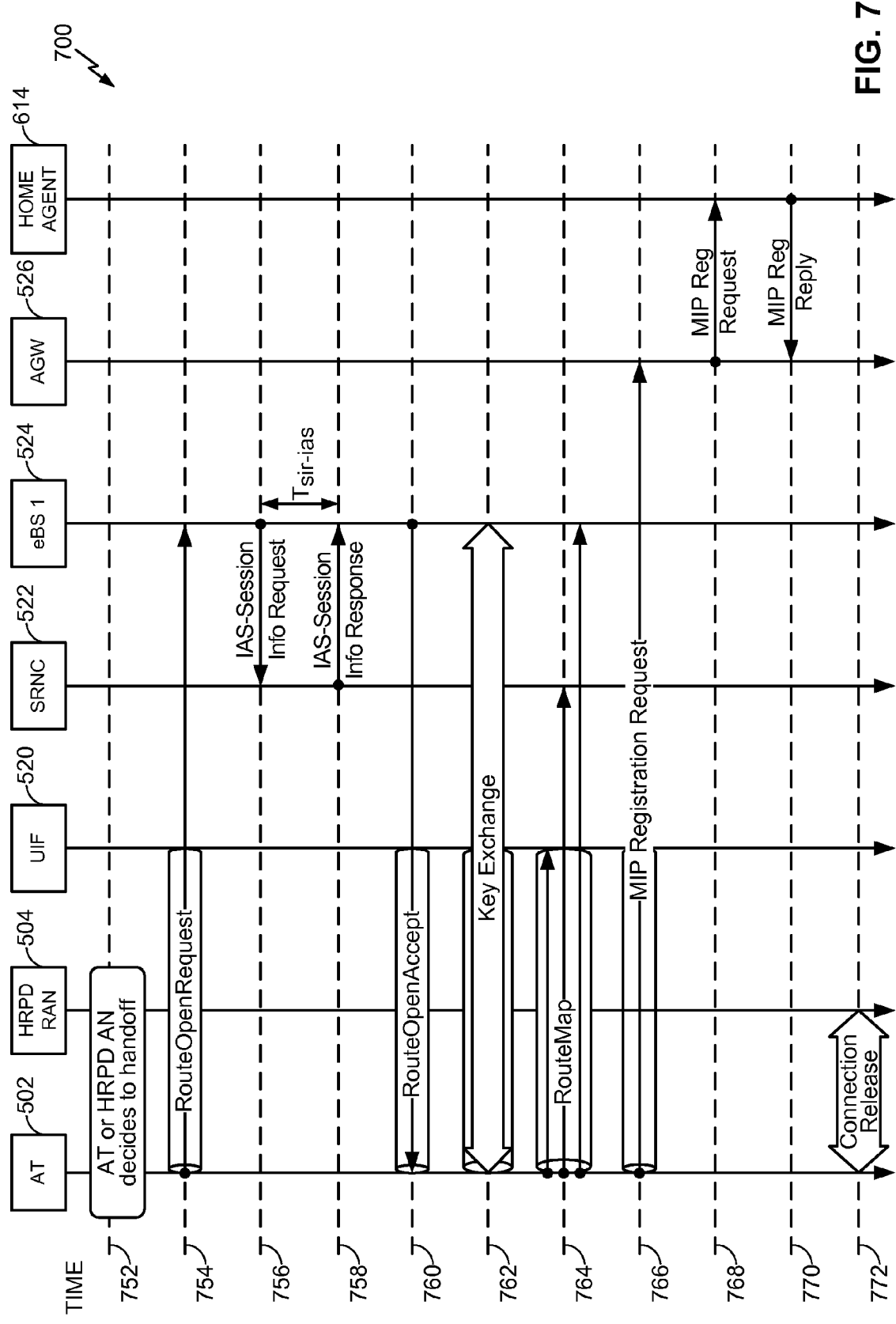
FIG. 7 is a call flow diagram of a process to facilitate a connection release by the AT from the HRPD network in accordance with one aspect of the disclosure.

FIG. 7 illustrates a call flow 700 to facilitate a connection release by the AT 502 from the HRPD AN 504 in accordance with one aspect of the disclosure where, starting at point 752, either the AT 502 or the HRPD AN 504 determines it is preferable to initiate the handoff.

At point 754, where the handoff is determined to be desirable, the AT 502 sends a RouteOpenRequest message to the UMB eBS 524, via the previously established tunnel to the UIF component 520. In an aspect of the disclosure, the UMB eBS 524 will receive the communication from the UIF component 520 through a backhaul communication network (not shown). The backhaul communication network is normally used by the various base stations to communicate with each other. The UMB eBS 524 will be unaware that the request sent by the AT 502 to the UIF component 520 was not initiated over a radio link.

At point 756, once the UMB eBS 524 receives the request from the AT to establish a session, the UMB eBS 524 sends an IAS-Session Information Request message to the UMB SRNC 522 to request a copy of the session information for the session between the UIF component 520 and the AT 502. The UMB eBS 524 will use this information to establish ultimately a session with the AT 520. The UMB eBS 524 will also start a timer $T_{sir-ias}$ as a timeout counter for the session information request.

At point 758, the UMB SRNC 522 sends an IAS-Session Information Response message to the UMB eBS 524 that will provide the base station with the session information and the AN ID of the DAP, which is the UIF component 520. Upon receipt of the message, the UMB eBS 524 stops timer $T_{sir-ias}$.

At point 760, the UMB eBS 524 sends a RouteOpenAccept message to the AT 502 to complete route establishment with the AT 502.

At point 762, the UMB eBS 524 completes a security establishment procedure such as a key exchange procedure with the AT 502. In one aspect of the disclosure, this can occur in parallel with point 760, where the UMB eBS 524 sent the RouteOpenAccept message to the AT 502 to complete route establishment with the AT 502.

At point 764, the AT 502 updates its own route map, which includes a list of base stations with which it may communicate, with information about the UIF component 520, the UMB SRNC 522 and the UMB eBS 524.

At point 766, the AT 502 sends a mobile IP (MIP) registration request message to the UMB AGW 526. As further described herein, the MIP registration request will allow the AT to transition from the IP address it has on the HRPD RAN 504 to a different IP address on the UMB RAN, but without loss of data.

At point 768, the UMB AGW 526 forwards the MIP Registration Request message to a home agent 614 of the AT 502. In one aspect, the home agent 614 maintains a public IP address for the AT 502 so that even if the AT 502 switches between different networks and is assigned different IP addresses by each of the different networks, the AT 502 may still be reached by its public IP address. The home agent 614 will be updated with the new IP address of the AT 502 with the AGW 526 by the MIP Registration Request.

At point 770, the home agent updates the AT 502's binding record and sends an MIP Registration Reply message to the UMB AGW 526, which then holds the message until a data path to send information to the AT 502 is reestablished.

At point 772, upon the assignment of the new DAP and a new Link ID, the AT 502 can release its connection with the HRPD AN 504. In one aspect, this point may occur any time after point 770.

Figure 8:
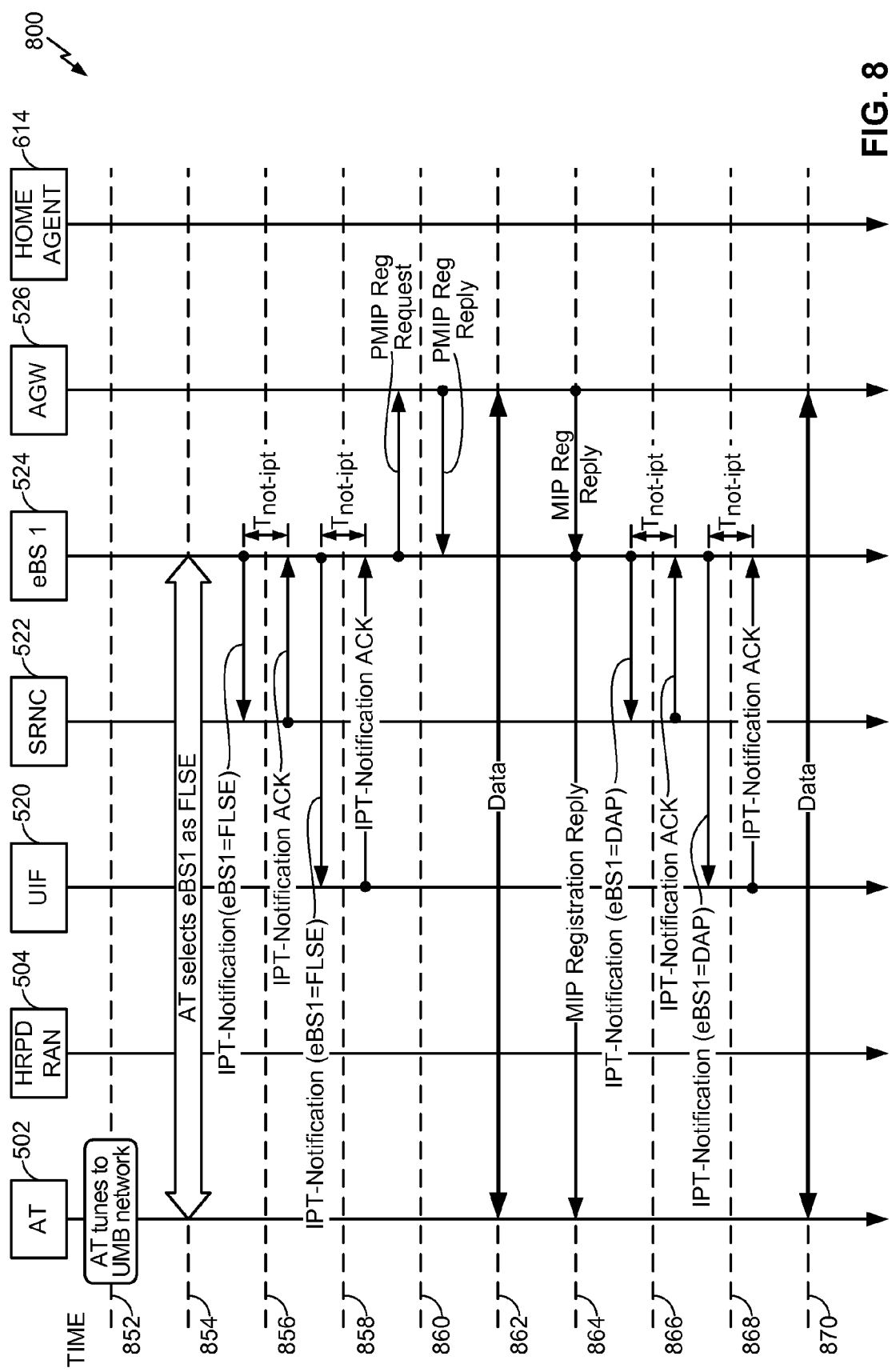
FIG. 8 is a call flow diagram of a process to facilitate a session establishment by the AT with the UMB network in accordance with one aspect of the disclosure.

FIG. 8 illustrates a call flow process 802 to facilitate a session establishment by the AT 502 with the UMB RAN in accordance with one aspect of the disclosure.

At point 852, the AT 502 tunes its radio to the UMB RAN. Specifically, continuing with the example given herein, the AT 502 tunes its radio to the UMB eBSI 524.

At point 854, the AT 502 selects the UMB eBS 524 as its new FLSE, which will cause the UMB eBS 524 to initiate contact with the control end point, the UMB SRNC 522, to inform it that the base station is now responsible for communication with the AT 502, as described below.

At point 856, the UMB eBS 524 sends IPT-Notification message to the UMB SRNC 522 and starts a timer $T_{not-ipt}$. The message contains the AN ID of the UMB eBS 524. Upon receipt of the IPT-Notification message, the UMB SRNC 522 sends back an IPT-Notification ACK message to the UMB eBS 524. Upon receipt of this acknowledgement, the UMB eBS 524 stops the timer $T_{not-ipt}$. In an aspect of the disclosure, the events described in points 856 and 858 may occur in parallel.

At point 858, the UMB eBS 524 sends an IPT-Notification message to the UIF component 520 to inform the UIF component 520 that the UMB eBS 524 is now handling communication with the AT 502 and starts timer $T_{not-ipt}$. The message contains the AN ID of the UMB eBS 524. Upon receipt of the IPT-Notification message, the UIF 520 sends back an IPT-Notification ACK message to the UMB eBS 524. Upon receipt of this acknowledgement, the UMB eBS 524 stops timer $T_{not-ipt}$.

At point 860, the UMB eBS 524 updates the PMIP binding with the UMB AGW 526 by sending a PMIP-Registration Request message to the UMB AGW 526 and starts timer $T_{rrq-pmip}$. This step may occur any time after point 756 of FIG. 7, where the UMB eBS 524 sent an IAS-Session Information Request message to the UMB SRNC 522 to request a copy of the session and started timer $T_{sir-ias}$.

At point 862, the UMB AGW 526 confirms the binding update by sending back a PMIP-Registration Reply message to the UMB eBS 524. Upon receipt of the reply, the UMB eBS 524 stops timer $T_{rrq-pmip}$. After this point, the UMB eBS 524 becomes the new DAP and data flows to and from the AT 502 resumes.

At point 864, the UMB AGW 526 sends the buffered MIP Registration Reply to the DAP, which is the UMB eBS 524. The UMB eBS 524 then forwards MIP Registration Reply to the AT 502.

At point 866, the UMB eBS 524 sends IPT-Notification message to the UMB SRNC 522 with the indication it is the new DAP and starts timer $T_{not-ipt}$. Upon receipt of the IPT-Notification message, the UMB SRNC 522 sends back an IPT-Notification Ack message to the UMB eBS 524. Upon receipt of this acknowledgement, the UMB eBS 524 stops timer $T_{not-ipt}$.

At point 868, the UMB eBS 524 sends an IPT-Notification message to the UIF 520 to indicate it is the new DAP and starts timer $T_{not-ipt}$. Upon receipt of the IPT-Notification message, the UIF component 520 sends back an IPT-Notification Ack message to the UMB eBS 524 and the AT 502 will now communicate with UMB eBS 524. Upon receipt of this acknowledgement, the UMB eBS 524 stops timer $T_{not-ipt}$. In aspect of the disclosure, the various operations in points 866 and 868 may occur in parallel.

Figure 9:
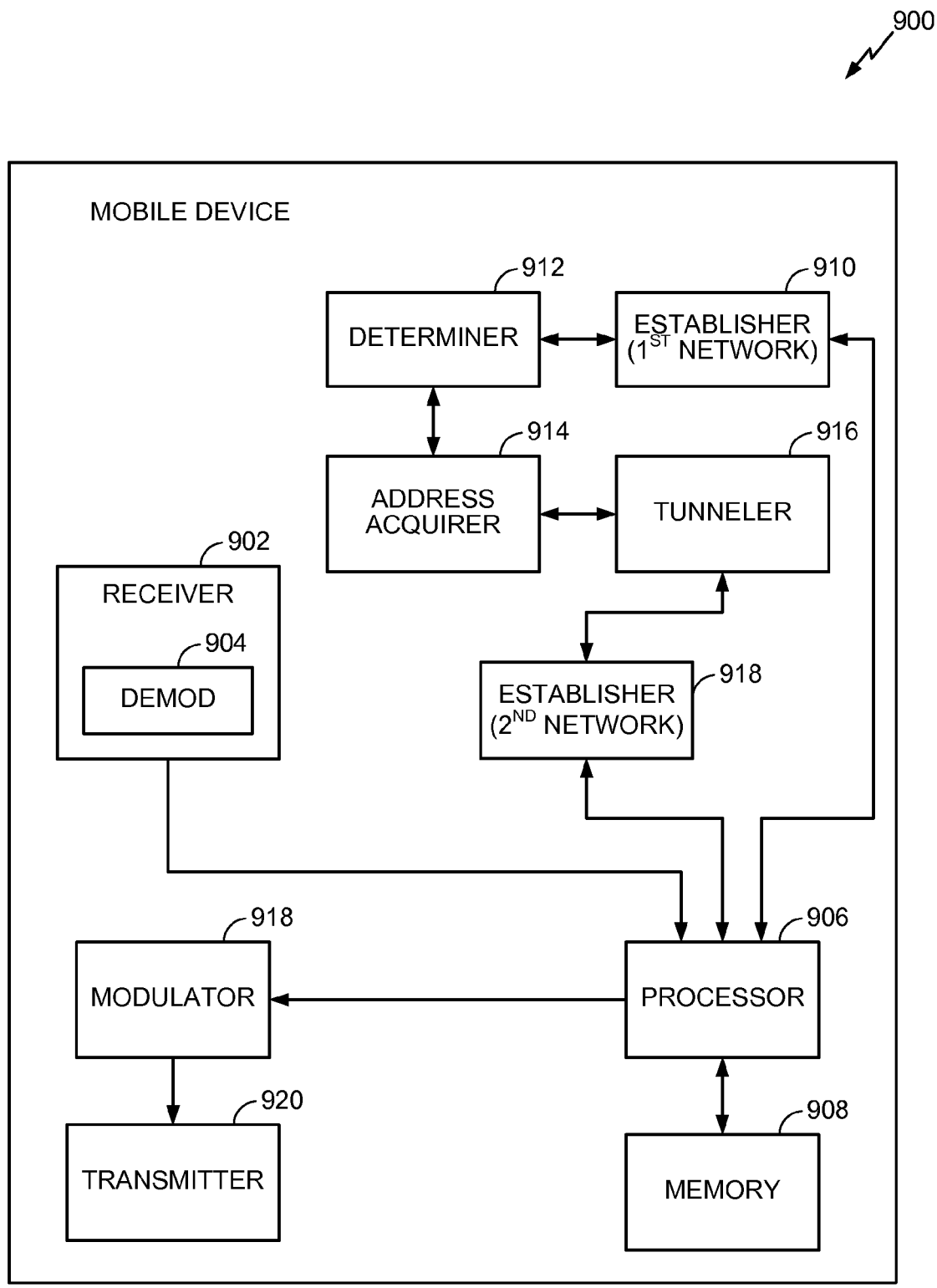
FIG. 9 is a block diagram of a mobile device that facilitates seamless handoffs between two different types of networks configured in accordance to one aspect of the disclosure.

FIG. 9 is an illustration of a mobile device 900 that facilitates handoff between networks that do not inter-operate with the same wireless communication protocol. In some cases, the networks can have completely incompatible communication protocols.

The mobile device 900 includes a receiver 902 that receives a signal from, for instance, a receive antenna (not shown), performs typical actions on (e.g., filters, amplifies, downconverts, etc.) the received signal, and digitizes the conditioned signal to obtain samples. Receiver 902 can include a demodulator 904 that can demodulate received symbols and provide them to a processor 906 for channel estimation. Processor 906 can be a processor dedicated to analyzing information received by receiver 902 and/or generating information for transmission by a transmitter 920, a processor that controls one or more components of the mobile device 900, and/or a processor that both analyzes information received by receiver 902, generates information for transmission by transmitter 920, and controls one or more components of the mobile device 900.

The mobile device 900 can additionally include memory 908 that is operatively coupled to processor 906 and that can store data to be transmitted, received data, information related to available channels, data associated with analyzed signal and/or interference strength, information related to an assigned channel, power, rate, or the like, and any other suitable information for estimating a channel and communicating via the channel. Memory 908 can additionally store protocols and/or algorithms associated with estimating and/or utilizing a channel (e.g., performance based, capacity based, etc.).

It will be appreciated that the data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to include, without being limited to, these and any other suitable types of memory.

The mobile device 900 can further include a first network establisher 910 that can establish a first communication session with a first wireless communication network having a first communication protocol, a determiner 912 that can determine a desire to handoff to a second wireless communication network having a second communication protocol, wherein the second wireless communication network and the first wireless communication network are incompatible for communication. The mobile device also includes an address acquirer 914 to obtain an address of an interworking function corresponding to the second wireless communication network, wherein the interworking function is operable to establish a second communication session in the second wireless communication network, a tunneler 916 that tunnels, via the first communication protocol, a message through the first communication network to the interworking function based on the address, wherein the message includes a payload including session transfer information in the second communication protocol; and, a second network establisher 918 that establishes a second communication session with the second wireless communication network in the second communication protocol, wherein the second communication session is based on the message.

Figure 10:
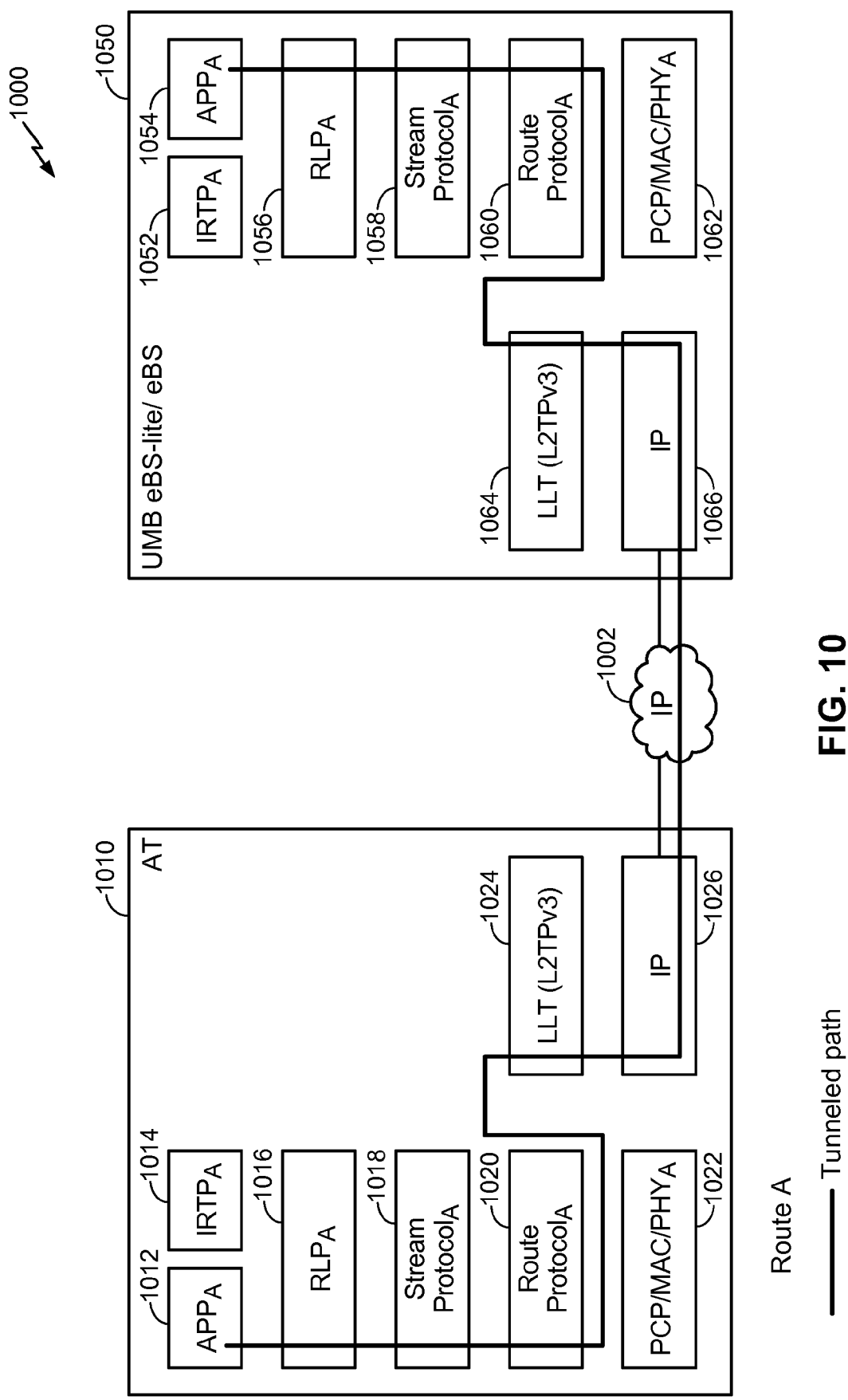
FIG. 10 is a block diagram of a transport protocol for an AT to establish a route using Link-Layer Tunneling (LLT) configured in accordance to one aspect of the disclosure.

FIG. 10 is used to describe aspects of a HRPD to UMB handoff where there is a usage of a Link-Layer Tunneling (LLT) interface for UMB packet tunneling over IP. In an aspect of the disclosure, pre-setup of a UMB session while an AT is on an HRPD AN can be accomplished transparently to the HRPD network to an existing UMB eBS by allowing the AT to support the LLT interface. The LLT interface is used for tunneling the UMB route protocol packets over the HRPD network. The communication between the AT and the UMB eBS to pre-setup a UMB session and perform authentication before the AT is handed off to the UMB is completely transparent the HRPD network. In FIG. 10 a transport protocol is shown when an AT 1010 uses the LLT interface to establish a route for an UMB eBS 1050. When communicating over the LLT interface 1024, the AT 1010 shall set the destination IP address to the IP address of the UMB eBS 1050. The UMB eBS 1050 shall set the destination IP address to the IP address that it has received over the LLT tunnel on the LLT interface 1064 if no IPT-Notification message is received indicating that the sender is the FLSE. The communication between IP stack 1026 and IP stack 1066 occurs completely over the IP network 1002 that, before the transition from the HRPD AN to the UMB RAN, is performed completely over the PHY and MAC protocols of the HRPD. Thus, although not show, the output of IP stack 1026 is fed into a stack for the HRPD system.

While the specification describes particular examples of the present invention, those of ordinary skill can devise variations of the present invention without departing from the inventive concept. For example, the teachings herein refer to circuit-switched network elements but are equally applicable to packet-switched domain network elements.

Figure 11:
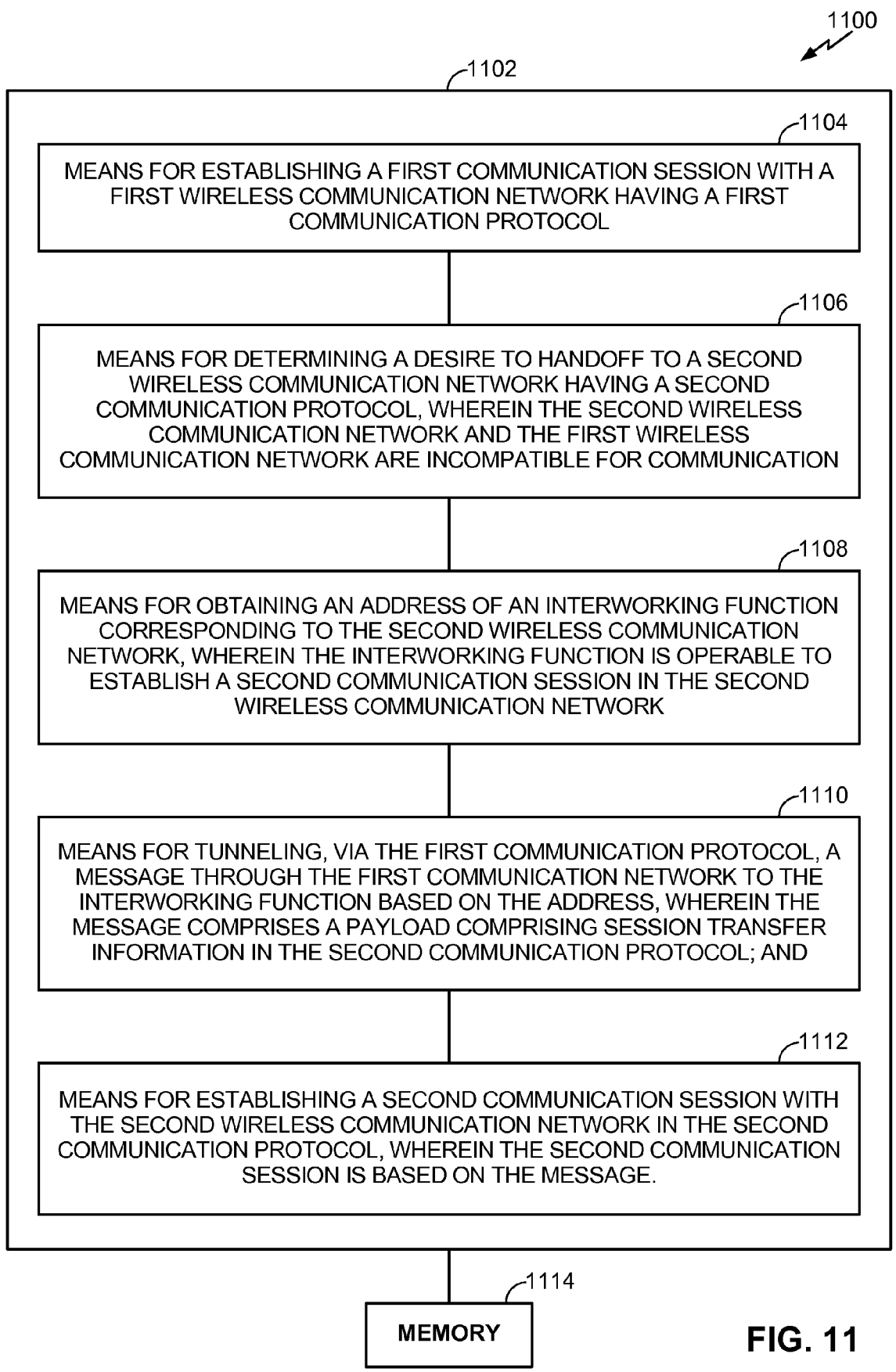
FIG. 11 is an illustration of an example system for a wireless communication device that facilitates a seamless handoff between two different types of networks, such as that illustrated in FIG. 3, configured in accordance to one aspect of the disclosure.

FIG. 11 illustrates a system 1100 of a wireless communication device for facilitating a handoff between networks. As depicted, the system 1100 includes functional blocks that can represent functions implemented by a processor, software, or combination thereof (e.g., firmware). The system 1100 includes a logical grouping 1102 of electrical components that facilitate handing off between networks. Logical grouping 1102 can include means for establishing a first communication session with a first wireless communication network having a first communication protocol 1104. In this regard, the wireless communication device can communicate with the first wireless communication network as described herein. Moreover, logical grouping 1102 can include means for determining a desire to handoff to a second wireless communication network having a second communication protocol, wherein the second wireless communication network and the first wireless communication network are incompatible for communication 1106. Thus, the wireless communication device can communicate with the second wireless communication network even though the first and second wireless communication networks cannot communicate with each other. Furthermore, logical grouping 1102 can include means for obtaining an address of an interworking function corresponding to the second wireless communication network, wherein the interworking function is operable to establish a second communication session in the second wireless communication network 1108. In this regard, the wireless communication device can initiate communication with an internetworking device that is configured to establish, in the second wireless communication network, a second communication session. Additionally, the system 1100 can include a memory 1114 that retains instructions for executing functions associated with electrical components 1104, 1106, 1108, 1110 and 1112. While shown as being external to memory 1114, it is to be understood that electrical components 1104, 1106, 1108, 1110 and 1112 can exist within memory 1110.

Figure 12:
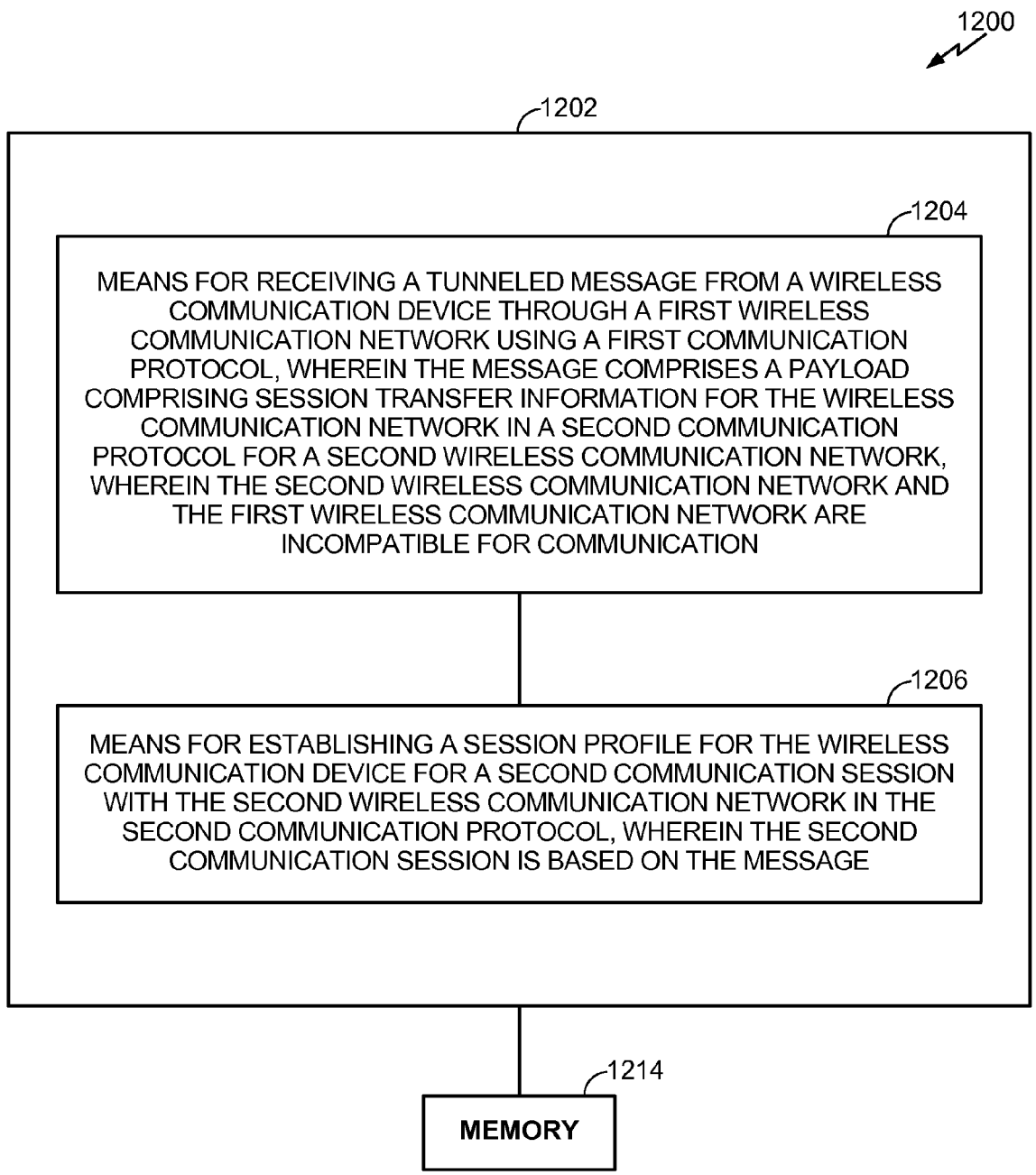
FIG. 12 is an illustration of an example system for an internetwork function component that facilitates a seamless handoff between two different types of networks.

FIG. 12 illustrates a system 1200 of an internetwork function for facilitating a handoff between networks. As depicted, the system 1200 includes functional blocks that can represent functions implemented by a processor, software, or combination thereof (e.g., firmware). The system 1200 includes a logical grouping 1202 of electrical components that facilitate handing off between networks. Logical grouping 1202 can include means for receiving a tunneled message from a wireless communication device through a first wireless communication network using a first communication protocol, wherein the message includes a payload including session transfer information for the wireless communication network in a second communication protocol for a second wireless communication network, wherein the second wireless communication network and the first wireless communication network are incompatible for communication 1204. In this regard, the interworking function can communicate with the wireless communication device to receive messages for the second wireless communication network as described herein. Moreover, logical grouping 1202 can include means for establishing a session profile for the wireless communication device for a second communication session with the second wireless communication network in the second communication protocol, wherein the second communication session is based on the message 1206. Thus, the wireless communication device can establish a communication session to communicate with the second wireless communication network via the interworking function even though the first and second wireless communication networks cannot communicate with each other. Additionally, the system 1200 can include a memory 1214 that retains instructions for executing functions associated with electrical components 1204, and 1206. While shown as being external to memory 1214, it is to be understood that electrical components 1204, and 1206 can exist within memory 1210.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more example and aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method performed by a wireless communication device to facilitate a handoff between networks, comprising:
    establishing a first communication session with a first wireless communication network having a first communication protocol;
    determining a desire to handoff to a second wireless communication network having a second communication protocol, wherein the second wireless communication network and the first wireless communication network are incompatible for communication;
    obtaining an address of an interworking function corresponding to the second wireless communication network, wherein the interworking function is operable to establish a second communication session in the second wireless communication network;
    tunneling, via the first communication protocol, a data message through the first communication network to the interworking function based on the address of the interworking function, wherein the data message comprises a payload comprising session transfer information in the second communication protocol for the second wireless communication network, the session transfer information for the second communication network including handoff instructions and being completely transparent to the first communication network; and
    establishing a second communication session with the second wireless communication network in the second communication protocol, wherein the second communication session is based on the data message.

2. The method of claim 1, wherein obtaining the address of the interworking function comprises querying a Domain Name System (DNS) server for the address of the interworking function.

3. The method of claim 2, wherein the address query comprises performing a fully qualified domain name address query for the interworking function.

4. The method of claim 2, wherein the interworking function is one of a plurality of geographically distributed interworking functions, and the interworking function is chosen based on a predetermined criteria of the wireless communication device.

5. The method of claim 4, wherein the predetermined criteria comprises at least one of a geographic location, device profile, user identification, and session information.

6. The method of claim 1, wherein the tunnel comprises an Internet Protocol (IP)-based tunnel.

7. The method of claim 6, further comprising sending a Data Attachment Point Move Request (DAPMoveRequest) message to the interworking function.

8. The method of claim 1, wherein the first communication protocol comprises a High Rate Packet Data (HRPD) protocol.

9. The method of claim 1, wherein the second communication protocol comprises an Ultra Mobile Broadband (UMB) protocol.

10. The method of claim 1, wherein the second communication session establishment comprises creating a session profile on the second wireless communication network using a session controlling component for the second network via the interworking function.

11. The method of claim 10, wherein the second communication session profile creation comprises providing the interworking function with the session transfer information.

12. The method of claim 10, wherein the second communication session profile creation is based on a user identification.

13. The method of claim 10, wherein the session controlling component comprises a session reference network controller.

14. The method of claim 1, wherein the interworking function operates as a base station on the second wireless communication network.

15. The method of claim 12, wherein the base station comprises an Evolved Base Station (eBS).

16. The method of claim 1, further comprising receiving data buffered on a gateway on the second wireless communication network.

17. The method of claim 1, further comprising communicating with the second wireless network using at least one of the internetworking function and the second wireless communication network such that the second wireless communication network does not need to support a new communication interface to communicate with the wireless communication device.

18. At least one processor in a wireless communication device configured to facilitate a handoff between networks comprising:
    a first module for establishing a first communication session with a first wireless communication network having a first communication protocol;
    a second module for determining a desire to handoff to a second wireless communication network having a second communication protocol, wherein the second wireless communication network and the first wireless communication network are incompatible for communication;
    a third module for obtaining an address of an interworking function corresponding to the second wireless communication network, wherein the interworking function is operable to establish a second communication session in the second wireless communication network;
    a fourth module for tunneling, via the first communication protocol, a data message through the first communication network to the interworking function based on the address of the interworking function, wherein the data message comprises a payload comprising session transfer information in the second communication protocol for the second wireless communication network, the session transfer information for the second communication network including handoff instructions and being completely transparent to the first communication network; and
    a fifth module for establishing a second communication session with the second wireless communication network in the second communication protocol, wherein the second communication session is based on the data message.

19. A non-transitory computer-readable medium comprising:
    a first set of codes for causing a computer to establish a first communication session with a first wireless communication network having a first communication protocol;
    a second set of codes for causing a computer to determine a desire to handoff to a second wireless communication network having a second communication protocol, wherein the second wireless communication network and the first wireless communication network are incompatible for communication;
    a third set of codes for causing a computer to obtain an address of an interworking function corresponding to the second wireless communication network, wherein the interworking function is operable to establish a second communication session in the second wireless communication network;

a fourth set of codes for causing a computer to tunnel, via the first communication protocol, a data message through the first communication network to the interworking function based on the address of the interworking function, wherein the data message comprises a payload comprising session transfer information in the second communication protocol for the second wireless communication network, the session transfer information for the second communication network including handoff instructions and being completely transparent to the first communication network; and a fifth set of codes for causing a computer to establish a second communication session with the second wireless communication network in the second communication protocol, wherein the second communication session is based on the data message.

20. An apparatus for facilitating a handoff between networks, comprising:

means for establishing a first communication session with a first wireless communication network having a first communication protocol;

means for determining a desire to handoff to a second wireless communication network having a second communication protocol, wherein the second wireless communication network and the first wireless communication network are incompatible for communication;

means for obtaining an address of an interworking function corresponding to the second wireless communication network, wherein the interworking function is operable to establish a second communication session in the second wireless communication network;

means for tunneling, via the first communication protocol, a data message through the first communication network to the interworking function based on the address of the interworking function, wherein the data message comprises a payload comprising session transfer information in the second communication protocol for the second wireless communication network, the session transfer information for the second communication network including handoff instructions and being completely transparent to the first communication network; and means for establishing a second communication session with the second wireless communication network in the second communication protocol, wherein the second communication session is based on the data message.

* * * * *